US012467500B2

(12) United States Patent
De la Rosa Mitre et al.

(10) Patent No.: US 12,467,500 B2
(45) Date of Patent: Nov. 11, 2025

(54) SLOTTED SPRING DISC FOR A BEARING

(71) Applicant: Schaeffler Technologies AG & Co. KG, Herzogenaurach (DE)

(72) Inventors: Lucio De la Rosa Mitre, Xicohtzinco (MX); Alejandro Vazquez, Puebla (MX); Itzel Guadalupe Gomez Ruiz, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 148 days.

(21) Appl. No.: 18/368,558

(22) Filed: Sep. 14, 2023

(65) Prior Publication Data
US 2025/0092912 A1    Mar. 20, 2025

(51) Int. Cl.
*F16C 25/08*    (2006.01)

(52) U.S. Cl.
CPC ................. *F16C 25/083* (2013.01)

(58) Field of Classification Search
CPC ...... F16C 25/08; F16C 25/083; F16C 27/066; F16C 19/525; F16C 19/527; F16C 41/002; F16F 1/324; F16F 1/326; F16F 2224/02; F16F 2225/0241
USPC ....................................................... 267/161
See application file for complete search history.

(56) References Cited

U.S. PATENT DOCUMENTS

| | | | | |
|---|---|---|---|---|
| 3,206,220 | A * | 9/1965 | Ferranti | B23B 13/126 192/111.1 |
| 3,235,049 | A * | 2/1966 | Hufstader | F16F 1/324 192/103 A |
| 4,364,615 | A * | 12/1982 | Euler | F16C 35/063 384/903 |
| 4,496,137 | A * | 1/1985 | Reik | F16F 1/324 192/89.25 |
| 8,845,202 | B2 | 9/2014 | Teimel | |
| 2005/0012417 | A1 * | 1/2005 | Fasterding | H02K 5/1732 310/90 |
| 2006/0062505 | A1 * | 3/2006 | Hoefs | H02K 7/083 384/517 |

(Continued)

FOREIGN PATENT DOCUMENTS

| | | |
|---|---|---|
| EP | 2187775 A1 | 5/2010 |
| FR | 2608708 A1 | 6/1988 |

(Continued)

*Primary Examiner* — John Olszewski
*Assistant Examiner* — Aimee Tran Nguyen

(57) ABSTRACT

A slotted spring disc for a bearing includes an annular portion, a conical portion extending radially inward from the annular portion, and a plurality of slots extending from the annular portion through the conical portion. In some example embodiments, an outer ring of the annular portion is devoid of the plurality of slots. In an example embodiment, each of the plurality of slots extend purely radially inward from the outer ring through the annular portion. In some example embodiments, each of the plurality of slots extend through an entirety of the conical portion. In an example embodiment, each of the plurality of slots extend radially and circumferentially through the conical portion. In an example embodiment, each of the plurality of slots extend diagonally through the conical portion. An insulated bearing assembly including the slotted spring disc is also disclosed.

19 Claims, 1 Drawing Sheet

(56) References Cited

U.S. PATENT DOCUMENTS

| | | | | |
|---|---|---|---|---|
| 2007/0257569 A1* | 11/2007 | Heyder | ................... | F16F 1/326 |
| | | | | 310/66 |
| 2009/0304318 A1* | 12/2009 | Konno | ................... | F16C 33/62 |
| | | | | 384/492 |
| 2012/0243817 A1 | 9/2012 | Teimel | | |

FOREIGN PATENT DOCUMENTS

| | | | | |
|---|---|---|---|---|
| JP | 2007002946 A | * | 1/2007 | ............ F16C 27/066 |
| WO | 2015020978 A1 | | 2/2015 | |

* cited by examiner

SLOTTED SPRING DISC FOR A BEARING

TECHNICAL FIELD

The present disclosure relates generally to a spring disc, and more specifically to a slotted spring disc for a bearing.

BACKGROUND

Spring discs for bearings are known. One example is shown and described in U.S. Pat. No. 8,845,202 titled SPRING WASHER AND A BEARING BLOCK INCLUDING A SPRING WASHER to Teimel.

SUMMARY

Example embodiments broadly comprise a slotted spring disc for a bearing including an annular portion, a conical portion extending radially inward from the annular portion, and a plurality of slots extending from the annular portion through the conical portion. In some example embodiments, an outer ring of the annular portion is devoid of the plurality of slots. In an example embodiment, each of the plurality of slots extend purely radially inward from the outer ring through the annular portion. In some example embodiments, each of the plurality of slots extend through an entirety of the conical portion. In an example embodiment, each of the plurality of slots extend radially and circumferentially through the conical portion. In an example embodiment, each of the plurality of slots extend diagonally through the conical portion.

In some example embodiments, the plurality of slots are evenly distributed in a circumferential direction of the slotted spring disc. In some example embodiment, respective first portions of each of the plurality of slots disposed in the annular portion extend purely radially inwards. In an example embodiment, respective second portions of each of the plurality of slots disposed in the conical portion extend radially and circumferentially. In an example embodiment, respective second portions of each of the plurality of slots disposed in the conical portion extend diagonally.

In an example embodiment, a quantity of the plurality of slots is at least 20. In an example embodiment, a quantity of the plurality of slots is at least 40. In an example embodiment, the slotted spring disc includes a radiused portion connecting the annular portion to the conical portion, and each of the plurality of slots extends through an entirety of the radiused portion. In an example embodiment, a first thickness of the annular portion is the same as a second thickness of the conical portion. In an example embodiment, a width of each of the plurality of slots is the same. In an example embodiment, a circumferential width of a radially outer portion of the conical portion between a pair of the plurality of slots is greater than a circumferential width of a radially inner portion of the conical portion between the pair of the plurality of slots.

Other example embodiments broadly comprise an insulated bearing assembly including an insulated bearing and the slotted spring disc. The insulated bearing includes an outer ring with a first roller surface, an inner ring with a second roller surface, a rolling element disposed radially between the outer ring and the inner ring and contacting the first roller surface and the second roller surface, and an insulating ring, molded to the outer ring. The slotted spring disc contacts the insulating ring. In an example embodiment, the insulating ring has a radial wall and the annular portion contacts the radial wall.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
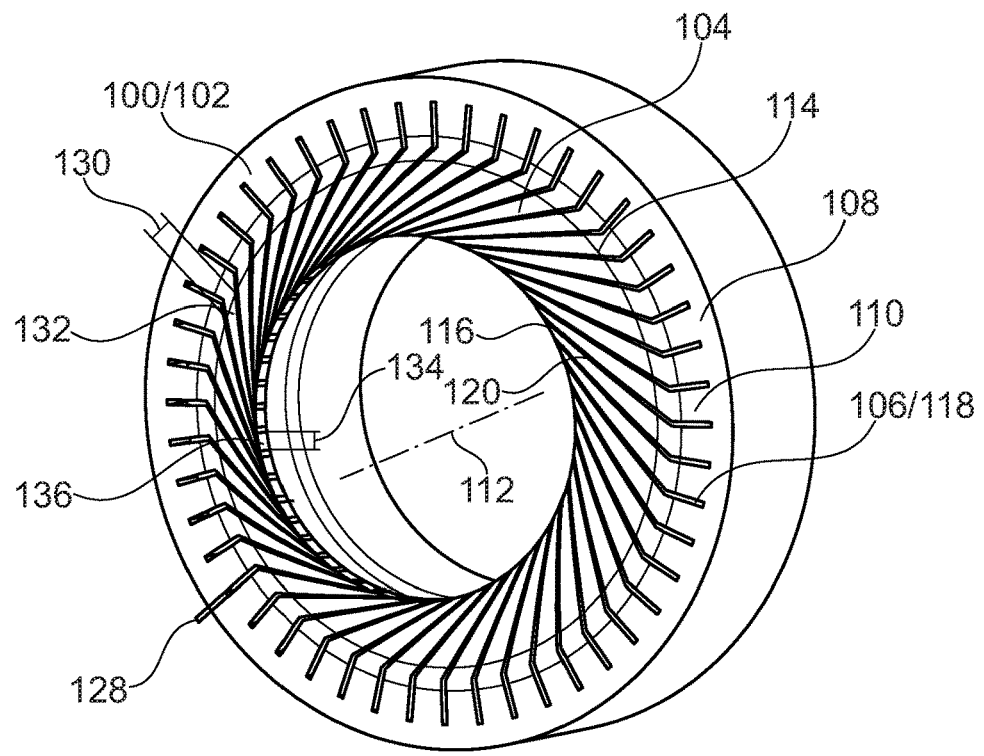
FIG. 1 illustrates a perspective view of a slotted spring disc assembled with a bearing according to an example embodiment.
Figure 2:
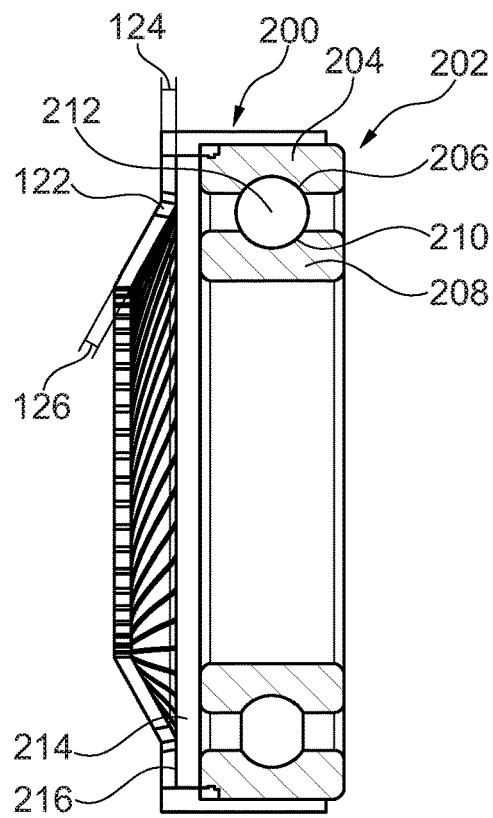
FIG. 2 illustrates a cross-sectional view of the slotted spring disc and bearing assembly of FIG. 1.

The following description is made with reference to FIGS. 1-2. FIG. 1 illustrates a perspective view of insulated bearing assembly 200 including slotted spring disc 100. FIG. 2 illustrates a cross-sectional view of the bearing assembly of FIG. 1. Slotted spring disc 100 includes annular portion 102, conical portion 104 extending radially inward from the annular portion, and slots 106 extending from the annular portion through the conical portion. Slotted spring disc 100 may be arranged to provide a preload to insulated bearing 202 of insulated bearing assembly 200 with installed, for example. Outer ring 108 of the annular portion is devoid of slots. That is, the outer ring is circumferentially complete to maintain integrity of the slotted spring disc and keeps individual disc portions 110 between slots 106 together as part of a singular spring disc 100.

Each of slots 106 extends purely radially inward from the outer ring through the annular portion. That is, the slots extend from the outer ring radially inwards towards center 112 of slotted spring disc 100. Each of slots 106 extend through an entirety of the conical portion. That is, the conical portion includes outer diameter 114 and inner diameter 116 and the slots extend through both diameters so that the conical portion is divided into individual disc portions 110. Each of slots 106 extend radially and circumferentially through the conical portion or, otherwise stated, each of slots 106 extend diagonally through the conical portion. Slots 106 are evenly distributed in a circumferential direction of the spring disc so that portions 110 between the slots are the same size.

Portions 118 of each of slots 106 are disposed in the annular portion and extend purely radially inwards towards center 112 and portions 120 of slots 106 disposed in the conical portion extend radially and circumferentially. Otherwise stated, portions 120 of each of slots 106 disposed in the conical portion extend diagonally. The diagonal slots permit portions 110 between the slots to be longer than if portions 120 extended radially. Analysis has shown that longer portions 120 have reduced stress when the slotted spring disc is compressed to preload insulated bearing 202 in a desired application, for example, or when the slotted spring disc experiences a transitory event during operation. In the embodiment shown, slotted spring disc 100 includes 48 slots 106, although other numbers of slots are possible. For example, some embodiments may have a quantity of slots that is at least 20 or a quantity of slots that is at least is at least 40.

Slotted spring disc 100 also includes radiused portion 122 connecting the annular portion to the conical portion. Each of slots 106 extends through an entirety of the radiused portion. Thickness 124 of the annular portion is the same as thickness 126 of the conical portion. Width 128 of each of slots 106 is the same. Circumferential width 130 of radially outer portion 132 of the conical portion between a pair of slots 106 is greater than circumferential width 134 of radially inner portion 136 of the conical portion between the pair of slots. In other words, disc portion 110 is circumferentially wider at radially outer portion 132 than at radially inner portion 136.

Insulated bearing assembly 200 includes insulated bearing 202 and slotted spring disc 100. Insulated bearing 202 includes outer ring 204 including roller surface 206, inner ring 208 including roller surface 210, and rolling element 212 disposed radially between the outer ring and the inner ring and contacting roller surfaces 206 and 210. Insulated bearing 202 also includes insulating ring 214, molded to the outer ring in a manner similar to what is shown and described in commonly-assigned German Patent Application Publication No. 10 2021 125 016 A1 titled Wälzlager (Rolling Bearing) to Winkler et al. Slotted spring disc 100 contacts insulating ring 214. Insulating ring 214 includes radial wall 216 and annular portion 102 contacts the radial wall.

Slotted spring disc 100 may be formed from plastic (e.g., polyamide PA6 nylon with glass fiber or Polytetrafluoroethylene PTFE) by injection molding, for example, so that contact with radial wall 216 of insulating ring 214 by annular portion 102 does not damage the insulating ring compared with a metal spring disc installed in a same manner. Analysis has shown that Stanyl HGR2 BK00001, a friction-modified high heat polyamide commercially available from DSM Engineering Materials may have desirable properties for this application.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

| REFERENCE NUMERALS | |
|---|---|
| 100 | Slotted spring disc |
| 102 | Annular portion |
| 104 | Conical portion |
| 106 | Slots |
| 108 | Outer ring |
| 110 | Disc portions between slots |
| 112 | Center of slotted spring disc |
| 114 | Outer diameter (conical portion) |
| 116 | Inner diameter (conical portion) |
| 118 | Portion of slots (first, annular portion) |
| 120 | Portion of slots (second, conical portion) |
| 122 | Radiused portion |
| 124 | Thickness (first, annular portion) |
| 126 | Thickness (second, conical portion) |
| 128 | Width (slots) |
| 130 | Circumferential width (first, radially outer portion of conical portion) |
| 132 | Radially outer portion (conical portion) |
| 134 | Circumferential width (second, radially inner portion of conical portion) |
| 136 | Radially inner portion (conical portion) |
| 200 | Insulated bearing assembly |
| 202 | Insulated bearing |
| 204 | Outer ring |
| 206 | Roller surface (first, outer ring) |
| 208 | Inner ring |
| 210 | Roller surface (second, inner ring) |
| 212 | Rolling element |
| 214 | Insulating ring |
| 216 | Radial wall (insulating ring) |

What is claimed is:

1. A slotted spring disc for a bearing, comprising:
an annular portion;
a conical portion extending radially inward from the annular portion; and
a plurality of slots extending from the annular portion through the conical portion,
wherein each of the plurality of slots extend: i) through an entirety of the conical portion, and ii) diagonally through the conical portion.

2. The slotted spring disc of claim 1 wherein an outer ring of the annular portion is devoid of the plurality of slots.

3. The slotted spring disc of claim 2 wherein each of the plurality of slots extend purely radially inward from the outer ring through the annular portion.

4. The slotted spring disc of claim 1 wherein each of the plurality of slots extend radially and circumferentially through the conical portion.

5. The slotted spring disc of claim 1 wherein the plurality of slots are evenly distributed in a circumferential direction of the slotted spring disc.

6. The slotted spring disc of claim 1 wherein respective first portions of each of the plurality of slots disposed in the annular portion extend purely radially inwards.

7. The slotted spring disc of claim 6 wherein respective second portions of each of the plurality of slots disposed in the conical portion extend radially and circumferentially.

8. The slotted spring disc of claim 1 wherein a quantity of the plurality of slots is at least 20.

9. The slotted spring disc of claim 1 wherein a quantity of the plurality of slots is at least 40.

10. The slotted spring disc of claim 1 further comprising a radiused portion connecting the annular portion to the conical portion, wherein each of the plurality of slots extends through an entirety of the radiused portion.

11. The slotted spring disc of claim 1 wherein a first thickness of the annular portion is the same as a second thickness of the conical portion.

12. The slotted spring disc of claim 1 wherein a width of each of the plurality of slots is the same.

13. The slotted spring disc of claim 1 wherein a first circumferential width of a radially outer portion of the conical portion between a pair of the plurality of slots is greater than a second circumferential width of a radially inner portion of the conical portion between the pair of the plurality of slots.

14. An insulated bearing assembly comprising:
an insulated bearing comprising:
an outer ring comprising a first roller surface;
an inner ring comprising a second roller surface;
a rolling element disposed radially between the outer ring and the inner ring and contacting the first roller surface and the second roller surface; and
an insulating ring, molded to the outer ring; and
the slotted spring disc of claim 1 contacting the insulating ring.

15. The insulated bearing assembly of claim 14 wherein:
the insulating ring comprises a radial wall; and
the annular portion contacts the radial wall.

16. A slotted spring disc for a bearing, comprising:
an annular portion;
a conical portion extending radially inward from the annular portion; and
a plurality of slots extending from the annular portion through the conical portion,
wherein respective first portions of each of the plurality of slots disposed in the annular portion extend purely radially inwards, and respective second portions of each of the plurality of slots disposed in the conical portion extend diagonally.

17. A slotted spring disc for a bearing, comprising:
an annular portion;
a conical portion extending radially inward from the annular portion; and
a plurality of circumferentially spaced slots extending: i) from the annular portion to the conical portion, and ii) diagonally within the conical portion.

18. The slotted spring disc of claim 17, wherein each of the plurality of circumferentially spaced slots comprise a first portion disposed in the annular portion and a second portion extending from the first portion and disposed in the conical portion.

19. The slotted spring disc of claim 18, wherein the first portion does not extend completely through the annular portion.

* * * * *